(12) United States Patent
Varshneya et al.

(10) Patent No.: US 9,796,621 B2
(45) Date of Patent: Oct. 24, 2017

(54) STRENGTHENED GLASS AND METHODS FOR MAKING USING HEAT TREATMENT

(71) Applicant: Saxon Glass Technologies, Inc., Alfred, NY (US)

(72) Inventors: Arun K. Varshneya, Alfred, NY (US); Patrick K. Kreski, Alfred Station, NY (US)

(73) Assignee: Saxon Glass Technologies, Inc., Alfred, NY (US)

( * ) Notice: Subject to any disclaimer, the term of this patent is extended or adjusted under 35 U.S.C. 154(b) by 716 days.

(21) Appl. No.: 14/054,489

(22) Filed: Oct. 15, 2013

(65) Prior Publication Data

US 2014/0178663 A1    Jun. 26, 2014

Related U.S. Application Data

(60) Provisional application No. 61/714,054, filed on Oct. 15, 2012.

(51) Int. Cl.
*C03C 21/00* (2006.01)

(52) U.S. Cl.
CPC .................. *C03C 21/002* (2013.01)

(58) Field of Classification Search
None
See application file for complete search history.

(56) References Cited

U.S. PATENT DOCUMENTS

| | | |
|---|---|---|
| 3,433,611 A | 3/1969 | Saunders et al. |
| 3,453,095 A | 7/1969 | Loukes et al. |
| 4,671,814 A | 6/1987 | Aratani et al. |
| 4,859,636 A | 8/1989 | Aratani et al. |
| 5,654,057 A | 8/1997 | Kitayama et al. |
| 6,748,765 B2 | 6/2004 | Pitbladdo |
| 6,810,688 B1 | 11/2004 | Duisit et al. |
| 7,059,154 B1 | 6/2006 | Quentin et al. |
| 7,743,630 B2 | 6/2010 | Krasnov et al. |
| 8,304,078 B2 | 11/2012 | Varshneya |
| 8,507,392 B2 | 8/2013 | Yamauchi et al. |
| 2005/0090377 A1 | 4/2005 | Shelestak et al. |
| 2006/0075783 A1 | 4/2006 | Kim et al. |
| 2009/0226671 A1 | 9/2009 | Yanase et al. |
| 2011/0293928 A1 | 12/2011 | Chu et al. |
| 2012/0085130 A1 | 4/2012 | Hill et al. |
| 2012/0094084 A1 | 4/2012 | Fisher et al. |
| 2012/0207980 A1 | 8/2012 | Yui et al. |
| 2012/0240626 A1 | 9/2012 | Matsumoto et al. |
| 2012/0295072 A1 | 11/2012 | Kato et al. |
| 2012/0321898 A1 | 12/2012 | Meinhardt et al. |
| 2013/0269392 A1 | 10/2013 | Ono et al. |

FOREIGN PATENT DOCUMENTS

| | | |
|---|---|---|
| JP | S58115043 A | 7/1983 |
| JP | S61205641 A | 9/1986 |
| JP | 2008123635 A | 5/2008 |
| TW | 201228952 A1 | 7/2012 |
| TW | 201245076 A1 | 11/2012 |
| WO | 2012048293 A2 | 4/2012 |
| WO | 2012077796 A1 | 6/2012 |

OTHER PUBLICATIONS

U.S. Appl. No. 14/808,970, filed Jul. 24, 2015, Kreski.
International Search Report for International Application No. PCT/JP2014/060351, mailed Jul. 8, 2014, 4 pages.
Office Action for corresponding Taiwanese Patent Application No. 103112605, dated Aug. 24, 2017, English translation of Search Report included, 5 pages.

*Primary Examiner* — Cynthia Szewczyk
(74) *Attorney, Agent, or Firm* — Ditthavong & Steiner, P.C.

(57) ABSTRACT

Chemically strengthened glass with reduced induced curvature and a method for making utilizing a heat treatment are provided. The method includes providing a substrate, having a width, and characterized by having a glass chemical structure including host alkali ions having an average ionic radius situated in the glass chemical structure. The substrate also includes dimensional volumes including a treatment-rich volume and a treatment-poor volume located as opposed to each other in the provided substrate. The method also includes heating the provided substrate to a heat-treating temperature for a heat-treating period to produce a heat-treated substrate. The method also includes providing an exchange medium including invading alkali ions. The method also includes applying the exchange medium and conducting ion exchange to produce the strengthened substrate with reduced induced curvature.

18 Claims, 3 Drawing Sheets

Graph 200

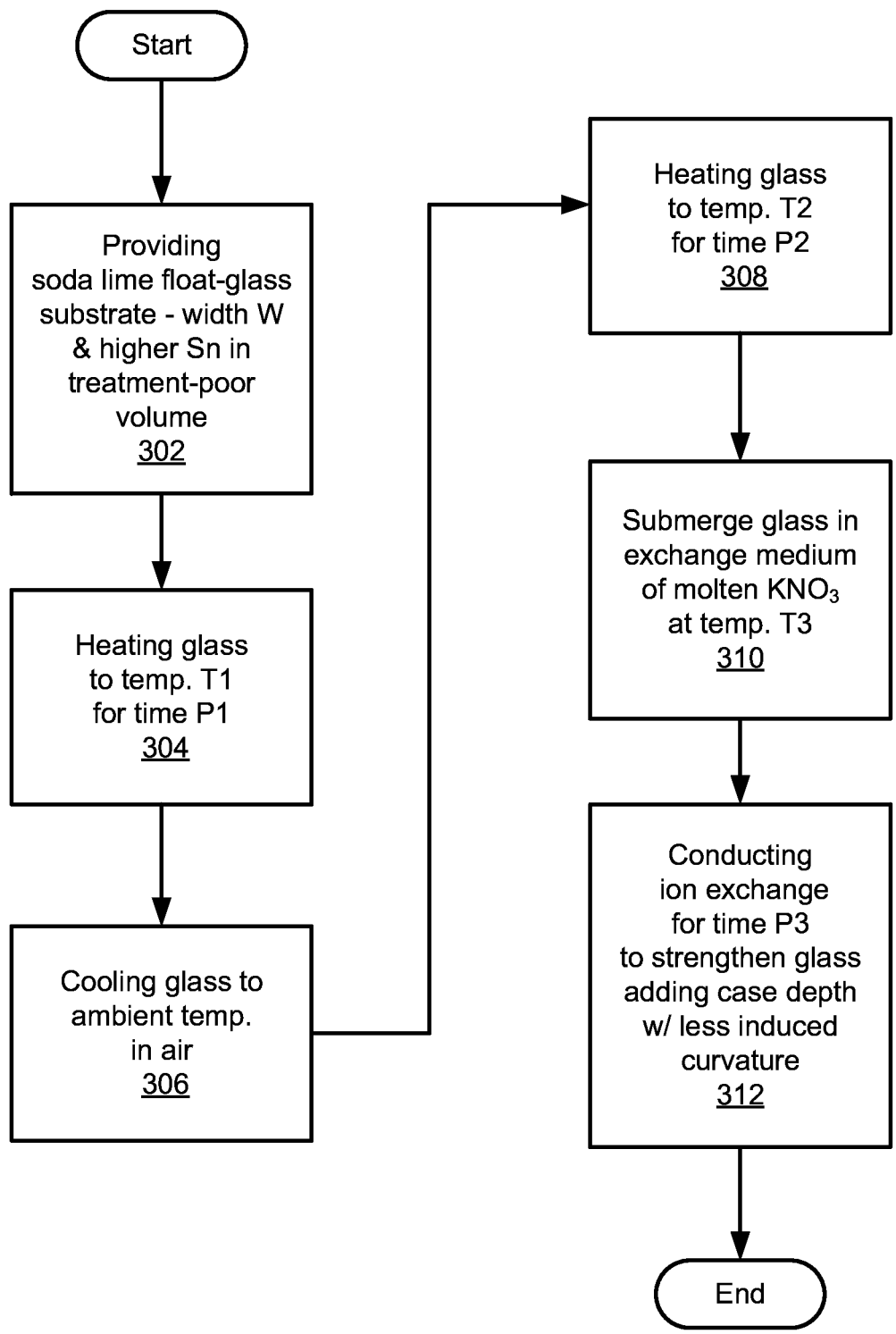

STRENGTHENED GLASS AND METHODS FOR MAKING USING HEAT TREATMENT

PRIORITY

This application claims priority to U.S. Provisional application No. 61/714,054 entitled "Strengthened Glass and Methods for Making" by Arun K. Varshneya et al. filed on Oct. 15, 2012, which is incorporated herein by reference in its entirety.

BACKGROUND

Chemical strengthening of glass, also called ion-exchange strengthening or chemical tempering, is a technique to strengthen a prepared glass article by increasing compression within the glass itself. It generally involves introducing larger alkali ions into the glass chemical structure to replace smaller alkali ions already present in the structure. A common implementation of chemical strengthening in glass occurs through the exchange of sodium ions, having a relatively smaller ionic radius, with potassium ions, having a relatively larger ionic radius by submerging a glass substrate containing the sodium ions in a bath containing molten potassium salts.

Chemical strengthening is often utilized to increase compression in glass. Increased compression within the glass of a glass part is associated with increased strength, increased abrasion resistance and/or increased thermal shock resistance in the glass. The increased compression can be introduced to various depths in glass and is often implemented within a glass surface layer. Chemical strengthening is commonly utilized for treating flat glass. But it may also be used for treating non-flat glass articles, such as cylinders and other shapes of greater geometric complexity.

Flat glass is commonly manufactured by a number of known techniques. These include the float glass method and drawing methods, such as the fusion down-draw method and the slot draw method. However, a prepared flat glass article may have variations in its chemical composition and/or structure at different locations in the glass. For example, flat glass that is manufactured by the float glass technique is often prepared by spreading softened glass material on a molten metal surface such as tin. The glass is then cooled to form a solid, flat glass. As a result, the prepared flat glass often contains a greater amount of tin on the side that was nearer the molten tin and the concentration of tin is commonly greater near the surface of that side.

Chemical strengthening is often used to treat glass having variations in chemical composition and/or structure at different locations in the glass. The variations produce locations that are treatment-rich or treatment-poor relative to each other for ion exchange and/or compression development in chemical strengthening. When chemical strengthening is used to treat such glass, the introduced compressive stress is often not uniformly distributed.

When compressive stress is not evenly distributed in chemically strengthened glass, this may introduce a bending moment and, subsequently, an induced curvature in the glass treated by chemical strengthening. The effect of introducing induced curvature by chemical strengthening is particularly apparent for glass articles having a smaller width. This is commonly problematic in flat glass having a smaller width, such as less than 25 millimeters, as the bending moment in thinner glass introduces greater curvature from chemical strengthening. Float glass substrates having a width of 2.0 mm or less, and particularly those having a width of 1.0 mm or less, often suffer from having highly significant curvature introduced through chemical strengthening.

Induced curvature is often undesirable and is often especially problematic in manufacturing thin flat glass articles according to manufacturing specifications that call for the enhanced physical properties associated with chemical strengthening, but without significant induced curvature. For example, glass used in many manufactured electronic articles, such as displays for "smart" phones, often requires a display glass that is substantially flat and high in strength and in abrasion resistance.

Chemically strengthening a thin, flat glass substrate, such as an article having two major surfaces and variations in chemical structure or composition within the glass, is often associated with a non-equivalence of interdiffusion of invading alkali ions and/or compression generation properties between the major surfaces of the substrate. The effect is that local forces in the glass about the mid-plane, associated with distance from the mid-plane of the glass article, are not equivalent when compared as these occur from the treatment-poor surface to the mid-plane and from the treatment-rich surface to the mid-plane. Thus the net bending moment about the mid-plane in the glass is non-zero (i.e., there is a non-zero net bending moment of the stress about the mid-plane). As a result, bending stresses are generated.

For glass articles having a thin cross-section, bending stresses from chemical strengthening often generate deflection from flat in the glass article. This is especially common in glass made by a float glass method. But deflection is also generated in glasses made by other methods that have variations in chemical structure or composition within the glass. Thin glass manufactured using a float glass process often exhibits measurable curvature after chemical strengthening. The direction of curvature is often concave on a surface that is "poorer" in allowing interdiffusion of invading alkali ions and convex on a surface that is "richer" in allowing interdiffusion of invading alkali ions.

In recent years, various types of efforts have been made attempting to overcome the problem of induced curvature associated with the chemical strengthening of glass. One approach involves grinding and polishing a glass substrate prior to chemical strengthening. The grinding and polishing is performed to remove those parts of a glass having a different chemical composition and/or structure. An example of this approach is grinding and polishing a flat glass made by the float method to remove the surface layer(s) containing a significant amount of tin. However, grinding and polishing the float glass often introduces abrasions and may introduce other physical defects. These defects are compounded by the added time and expense associated with performing the grinding and polishing.

Other approaches have involved secondary chemical treatments of prepared glass done prior to chemical strengthening. The secondary chemical treatments are utilized in an attempt to address differences in chemical composition and/or structure at different locations in the glass. However secondary chemical treatments can alter the physical properties of the glass and otherwise degrade a glass produced through subsequent chemical strengthening. Also, like grinding and polishing, secondary chemical treatments involve the time and expense of extra processing done prior to chemical strengthening.

Given the foregoing, chemically strengthened glass and methods for making chemically strengthened glass are desired in which the strengthened glass has reduced induced curvature. It is also desired that the strengthened glass not have the drawbacks associated with grinding and polishing or secondary chemical treatment(s) applied in prior methods associated with the chemical strengthening of the glass. It is also desired that the strengthened glass having reduced induced curvature also have the improved physical properties of chemically strengthened glass, such as higher strength, higher abrasion resistance, and/or higher thermal shock resistance.

SUMMARY

This summary is provided to introduce a selection of concepts. These concepts are further described below in the detailed description in conjunction with the accompanying drawings. This summary is not intended to identify key features or essential features of the claimed subject matter, nor is this summary intended as an aid in determining the scope of the claimed subject matter.

According to an implementation, there is a method for making a strengthened substrate. The method includes providing a substrate. The provided substrate may have a width that is ≤ about 25.0 millimeters. The provided substrate may be characterized by having a glass chemical structure including host alkali ions having an average ionic radius situated in the glass chemical structure. The provided substrate may be characterized by having dimensional volumes including a treatment-rich volume and a treatment-poor volume located as opposed to each other in the provided substrate. The method includes heating the provided substrate to a heat-treating temperature for a heat-treating period to produce a heat-treated substrate. The heat-treating temperature may be ≥ about 250° C. and ≤ a maximum heat-treating temperature. The heat-treating period may be about 0.001-50 hours to produce a heat-treated substrate and if the heat-treating temperature may be ≤ about one of 325, 350, or 400° C., then the heat-treating period may be ≥ about 2 hours. The method may include providing an exchange medium. The exchange medium may include invading alkali ions having an average ionic radius that is larger than the average ionic radius of the host alkali ions. The method may include exposing the heat-treated substrate to the exchange medium. The method may include conducting ion exchange while exposing the heat-treated substrate to the exchange medium to produce the strengthened substrate. The strengthened substrate may include a compressive stress layer having a depth of about 1-500 µm.

According to another implementation, there is an article of manufacture. The article includes a strengthened substrate. The strengthened substrate may have a width ≤ about 25.0 millimeters. The strengthened substrate may have a compressive stress layer having a depth of about 1-500 µm. The strengthened substrate may be characterized by having a glass chemical structure including alkali ions situated in the glass chemical structure. The strengthened substrate may have dimensional volumes including a treatment-rich volume including a rich surface of the substrate and a treatment-poor volume including a poor surface of the substrate. The treatment-poor volume may be characterized by having a variation from the treatment-rich volume in at least one of a chemical composition and a chemical structure. The strengthened substrate may include a bulk volume, within the substrate, adjacent at least one of the treatment-rich volume and the treatment-poor volume. The strengthened substrate may include a concentration of metal in at least one of the treatment-poor volume and the treatment-rich volume. The concentration of metal in at least one of the treatment-poor volume and the treatment-rich volume may be ≥ about 0.4 mole % higher than a concentration of the metal in the bulk volume. The concentration of the metal may be higher in the treatment-poor volume than a concentration of the metal in the treatment-rich volume. The strengthened substrate may include a concentration of alkali ions in a diffusion depth of at least one of the treatment-rich volume and the treatment-poor volume. The concentration of alkali ions in a diffusion depth of at least one of the treatment-rich volume and the treatment-poor volume may be ≤ about 0.5 mole % higher than a concentration of the alkali ions in the bulk volume.

According to another implementation, there is an article of manufacture. The article includes a strengthened substrate. The strengthened substrate may have a compressive stress layer having a depth of about 1-500 µm. The strengthened substrate may be made by a process. The process includes providing a substrate. The provided substrate may have a width that is ≤ about 25.0 millimeters. The provided substrate may be characterized by having a glass chemical structure including host alkali ions having an average ionic radius situated in the glass chemical structure. The provided substrate may be characterized by having dimensional volumes including a treatment-rich volume and a treatment-poor volume located as opposed to each other in the provided substrate. The method includes heating the provided substrate to a heat-treating temperature for a heat-treating period to produce a heat-treated substrate. The heat-treating temperature may be ≥ about 250° C. and ≤ a maximum heat-treating temperature. The heat-treating period may be about 0.001-50 hours to produce a heat-treated substrate and if the heat-treating temperature may be ≤ about one of 325, 350, or 400° C., then the heat-treating period may be ≥ about 2 hours. The method may include providing an exchange medium. The exchange medium may include invading alkali ions having an average ionic radius that is larger than the average ionic radius of the host alkali ions. The method may include exposing the heat-treated substrate to the exchange medium. The method may include conducting ion exchange while exposing the heat-treated substrate to the exchange medium to produce the strengthened substrate.

The above summary is not intended to describe each embodiment or every implementation. Further features, their nature and various advantages are described in the accompanying drawings and the following detailed description of the examples and embodiments.

BRIEF DESCRIPTION OF THE DRAWINGS

The accompanying drawings, which are incorporated in and constitute a part of this specification, illustrate one or more embodiments described herein and, together with the description, explain these embodiments. In addition, it should be understood that the drawings are presented for example purposes only. In the drawings:

FIG. 3 is a flowchart illustrating an exemplary process for making a strengthened substrate utilizing heat treatment.

DETAILED DESCRIPTION

The following detailed description refers to the accompanying drawings. The same reference numbers in different drawings may identify the same or similar elements.

Overview

The present invention is useful for making chemically strengthened glass, and has been found to be particularly advantageous for making chemically strengthened glass having reduced induced curvature. A chemically strengthened glass, according to the principles of the invention, does not have the drawbacks associated with chemically strengthened glasses made utilizing grinding and polishing or secondary chemical treatment(s) when done prior to chemical strengthening. While the present invention is not necessarily limited to such applications, various aspects of the invention are appreciated through a discussion of various examples using this context.

Figure 1:
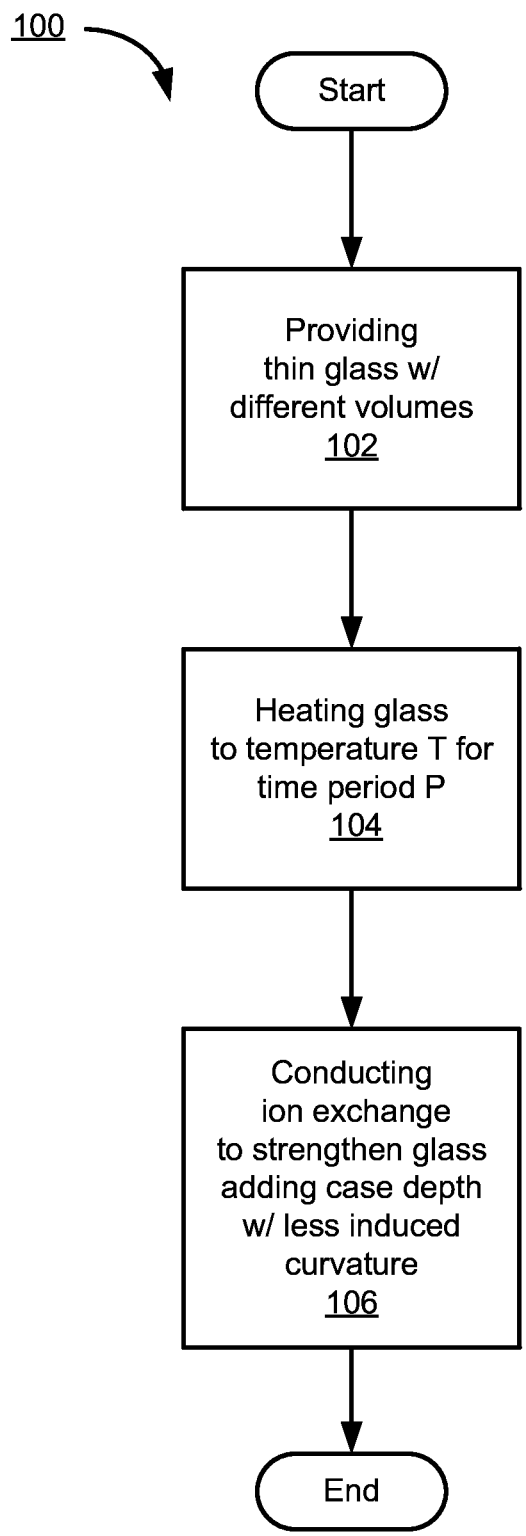
FIG. 1 is a flowchart illustrating an exemplary overview of an implementation described herein.
Figure 2:
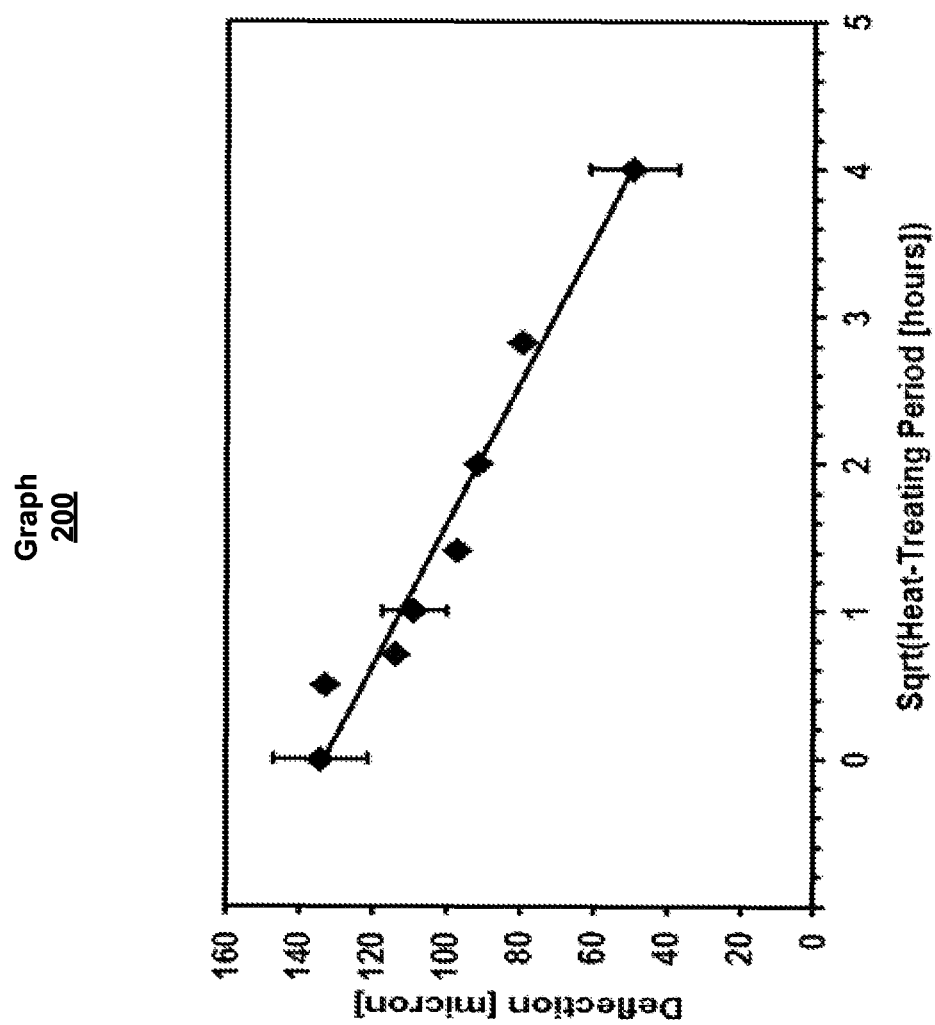
FIG. 2 is a graph showing properties of exemplary strengthened substrates made utilizing heat treatment prior to chemical strengthening.

FIG. 1 is a flowchart illustrating an exemplary overview of an implementation described herein. Assume that a glass substrate has variations in its chemical composition and/or chemical structure at different locations or "volumes" in the glass. One type of variation is present in a volume having a chemical composition and/or chemical structure that is more readily treated by chemical strengthening. This volume is a "treatment-rich" volume. Another type of variation is present in a volume having a chemical composition and/or chemical structure that is less readily treated by chemical strengthening. This is a "treatment-poor" volume.

The term "treatment-rich volume" refers to a volume of a glass substrate which exhibits faster alkali ion interdiffusion and/or greater compression development during chemical strengthening relative to a "treatment-poor volume" under equivalent chemical strengthening conditions applied to the glass substrate. A volume may occur at a surface of a substrate, or in a space or layer beneath the surface. A treatment-rich volume or treatment-poor volume may be a surface layer of a glass substrate in which the diffusion of invading alkali ions extends to a given "diffusion depth" from the surface, also called a penetration depth or a diffusion layer. In chemical strengthening, a portion of the diffusion depth is in compressive stress, called a "compressive stress layer" or a "case depth." Case depth is the width of the diffusion layer that is in compressive stress in a specimen. A "bulk volume" in a glass is a volume not affected by the diffusion of invading alkali ions. A bulk volume may occur in a glass volume, below or adjacent a diffusion depth of invading alkali ions or other types of ions in a glass.

According to a principle of the invention, a provided substrate is treated with heat in a "heat treatment" prior to chemical strengthening to form a "heat-treated substrate." A heat-treatment may be performed by exposing the provided substrate to a "heat-treating temperature" for a "heat-treating period." The amount of time and temperature(s) utilized in a heat treatment prior to chemical strengthening may be varied significantly with various types of glasses.

Applicants have discovered that by utilizing a heat-treating process to produce a heat-treated substrate prior to chemical strengthening, the induced curvature is reduced in a chemically strengthened substrate. The reduction in induced curvature associated with a heat treatment is particularly significant in glass substrates that are thinner, such as those having a width of about 25.0 millimeters or less. Significant reductions in induced curvature have also been demonstrated in glass substrates having a deeper case depth developed during chemical strengthening. Deeper case depths may be developed in various ways, such as by utilizing an extended ion-exchange period and/or a higher ion-exchange temperature in conducting ion-exchange for chemical strengthening.

As shown in FIG. 1, demonstrates an exemplary implementation of a chemical strengthening process 100 including a heat treatment.

At step 102, a "thin" glass substrate is provided having at least two different volumes, a treatment-rich volume and a treatment-poor volume as described above.

At step 104, a heat treatment is applied to the provided substrate by exposing the glass to a temperature T for a time period P. The period P can be varied and may be influenced by the temperature utilized for T in the heat treatment. A lower T temperature may require a longer time for P to achieve significant reduction in the induced curvature. In general, a minimum time period for P is at least about 0.001 hours and a maximum time period for P may be up to 50 hours or longer. In general, a minimum temperature for T is at least about 250° C. and a maximum temperature for T may be up to a maximum heat-treating temperature.

A maximum heat-treating temperature is a temperature at which a glass can deform or liquefy and may vary depending on the type and nature of glass and glass substrate. Those having skill in the art understand that deformation stems from glass viscosity which decreases rapidly with increasing temperature. Thus shorter heat-treating periods and/or lower heat-treating temperatures may be utilized in order to avoid measurable deformation in a glass substrate undergoing heat treatment according to the principles of the invention. If measures are taken to prevent deformation of a substrate that is to undergo heat treatment, such as by adding supports around a substrate undergoing heat treatment, the presence of the supports helps to prevent substrate deformation and increases the maximum heat-treating temperature for the substrate. For example, a maximum heat-treating temperature for some soda-lime silicate glass substrates is about 500° C. to 800° C. In another example, a maximum heat-treating temperature for some sodium aluminosilicate glass substrates is about 600° C. to 900° C. Deforming temperatures are known by those having skill in the art for most types of glass compositions and glass substrates utilized in chemical strengthening applications.

At step 106, the heat-treated substrate is exposed to an exchange medium for conducting ion exchange to produce a strengthened glass substrate. During ion exchange, a compressive stress layer or case depth develops in the heat-treated substrate to form a strengthened glass substrate. While the exchange medium is applied in step 106, chemical strengthening proceeds to produce a strengthened substrate in which the induced curvature has been reduced in that a smaller measure of induced curvature develops due to the heat treatment. Without wishing to be bound by any particular theory, it appears that the heat treatment prior to ion exchange reduces the induced curvature that would otherwise result from chemical strengthening of the glass substrate.

For simplicity and illustrative purposes, the present invention is described by referring mainly to embodiments, principles and examples thereof. In the following description, numerous specific details are set forth in order to provide a thorough understanding of the examples. It is readily apparent however, that the embodiments may be practiced without limitation to these specific details. In other instances, some embodiments have not been described in detail so as not to unnecessarily obscure the description. Furthermore, different embodiments are described below. The embodiments may be used or performed together in different combinations.

The operation and effects of certain embodiments can be more fully appreciated from the examples, as described below. The embodiments on which these examples are based are representative only. The selection of these embodiments to illustrate the principles of the invention does not indicate that materials, components, reactants, conditions, techniques, configurations and designs, etc. which are not described in the examples are not suitable for use, or that subject matter not described in the examples is excluded from the scope of the appended claims or their equivalents. The significance of the examples may be better understood by comparing the results obtained therefrom with potential results which may be obtained from tests or trials that may be, or may have been, designed to serve as controlled experiments and to provide a basis for comparison.

As used herein, the terms "based on", "comprises", "comprising", "includes", "including", "has", "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). Also, use of the "a" or "an" is employed to describe elements and components. This is done merely for convenience and to give a general sense of the description. This description should be read to include one or at least one and the singular also includes the plural unless it is obvious that it is meant otherwise.

The meaning of abbreviations and certain terms used herein is as follows: "mm" means millimeter(s), "μm" means micrometer(s) or micron(s), "g" means gram(s), "mg" means milligram(s), "μg" means microgram(s), "L" means liter(s), "mL" means milliliter(s), "cc" means cubic centimeter(s), "cc/g" means cubic centimeters per gram, "mol" means mole(s), "mmol" means millimole(s), "wt %" means percent by weight and "mol %" means percent by mole.

Exemplary Substrate Glasses

As used herein a "glass substrate" may comprise any kind of ion-exchangeable glass or glass-ceramic in which the ion exchangeable phase is a glass. Examples of glass include soda-lime silicate glass, alkali aluminosilicate glass or alkali aluminoborosilicate glass, though other glass compositions are contemplated including glasses where glass forming components are free of silica, such as boron oxide (borate), phosphorous oxide (phosphate), aluminum oxide (aluminate), etc. As used herein, "ion exchangeable" means that a glass is capable of exchanging alkali ions located in the glass structure of the glass (i.e., "host alkali ions"), such as at or near the surface of the substrate, with larger alkali ions (i.e., "invading alkali ions") from an exchange medium that may be a liquid, solid or gas. An "ion exchange rate" refers to an amount of invading ions entering a substrate over a period of time. A glass may have chemical composition and/or chemical structure variations at different locations or "volumes" in the glass. An example of chemical composition variation is an excess of metal, such as metal ions or other forms of metal and may include a metal species, such as tin or lead. An example is metal that remains in a flat glass made by a float glass method, such as tin. An example of chemical structure variation is the presence of an element in the glass in which the element may have different valences throughout different volumes, such as tin present in $Sn^{2+}$ and $Sn^{4+}$ valences in the different volumes. In this example, the different forms of tin form different chemical structures in the different volumes.

Exemplary embodiments of substrate glasses include silicate glasses, such as soda-lime silicate glass or sodium aluminosilicate glass that includes alumina, at least one alkali metal and, in some embodiments, greater than 50 mol % $SiO_2$, in other embodiments at least 58 mol % $SiO_2$, and in still other embodiments at least 60 mol % $SiO_2$. Exemplary embodiments of glass substrates include substrates having one or more widths of, for example, about 25, 20, 15, 10, 8, 6, 5, 4, 3, 2, 1, 0.7, 0.5, 0.25 and 0.1 mm. A common width and type of substrate glass is a coupon cut from a mother sheet of float glass having a width of 0.7 mm. An exemplary coupon may be varied in length and cross-area and may be flat or curved in part of the substrate prior to chemical strengthening.

Exemplary Heat Treatment Parameters

Without wishing to be bound by any particular theory, it appears that a heat treatment, according to the principles of the invention, brings about some chemical change or reaction within at least a treatment-poor volume of a glass substrate. The change may be through diffusion of a chemical species from the atmosphere or other external medium surrounding the substrate. Or the chemical change or reaction may develop from within the treatment-poor volume itself.

Applicants have discovered that a heat treatment process may be applied to achieve a desired reduction in induced curvature, when applied to a glass substrate prior to chemical strengthening according to the principles of the invention. A heat-treating temperature and heat-treating period may be approximated by an empirical relationship that is linked to the maximum heat-treating temperature of a glass substrate and a desired amount of reduced induced curvature. The empirical relationship is:

$$t \approx n \cdot (m-T)^2$$

wherein "t" is a heat-treating period in hours,
"n" is an empirical constant,
"m" is a maximum heat-treating temperature in ° C., and
"T" is a heat-treating temperature in ° C.

Thus, a heat-treating period "t" may be established for a glass substrate with a maximum heat-treating temperature "m" for a given heat-treating temperature "T". Those familiar with the science of diffusion may also appreciate that the width of the reaction layer affected by diffusion would increase with the square-root of time. Thus, higher temperatures or longer time periods favor a higher reduction in induced curvature. At higher temperatures, short heat-treating periods may be sufficient whereas, at lower temperatures, longer heat-treating periods may be utilized.

For example, for soda lime silicate glass substrates having a width less than about 2 mm, but more than about 0.25 mm, suitable values of "n" and "m" may be 0.0015 hours/(° C.)$^2$ and 610° C., respectively. Thus, for these soda lime silicate glass substrates, if a heat-treating period is ≤ about 1 hour, a heat-treating temperature utilized is ≥ about 575° C. If a heat-treating period is ≤ about 3 hours, a heat-treating temperature utilized is ≥ about 550° C. If a heat-treating period is ≤ about 6 hours, a heat-treating temperature utilized is ≥ about 525° C. If a heat-treating period is ≤ about 12 hours, a heat-treating temperature utilized is ≥ about 500° C. If a heat-treating period is ≤ about 18 hours, a heat-treating temperature utilized is ≥ about 475° C. If a heat-treating period is ≤ about 25 hours, a heat-treating temperature utilized is ≥ about 450° C.

Heat-treating temperatures which may be utilized may vary broadly and may be held constant or be an average of different temperatures. Exemplary embodiments of heat-treating temperatures which may be utilized in a heat treatment include from about 250° C. to 1,500° C. For some types of soda-lime silicate glass, heat-treatment temperatures above about 450° C. and preferably above about 500° C. may be used. Other exemplary heat-treating temperatures for various types of glasses include about 250, 300, 400, 500, 600, 700, 800, 900, 1,000, 1,100, 1,200, 1,300, 1,400 and 1,500° C., or higher temperatures.

Heat-treating periods of time which may be utilized may vary broadly and may be continuous or discontinuous. Exemplary embodiments of heat-treating periods which may be utilized in a heat treatment include from about 0.001 to 50 hours. For some types of soda-lime silicate glass, for example, heat-treating periods of about 1 to 6 hours may be utilized. Other exemplary heat-treating periods for various types of glasses include a period in hours of about 0.001, 0.01, 0.1, 0.5, 1, 2, 4, 5, 6, 8, 10 20, 25 and 50 hours, or longer.

According to an exemplary embodiment, the heat-treating period is ≥0.5 hours and if the heat-treating period is about 0.5-1 hours, then heat-treating temperature utilized is ≥about 575° C.; if the heat-treating period is ≤ about 1-3 hours, then the heat-treating temperature utilized is ≥ about 550° C.; if the heat-treating period is ≤ about 3-6 hours, then the heat-treating temperature utilized is ≥ about 525° C.; if the heat-treating period is ≤ about 6-12 hours, then the heat-treating temperature utilized is ≥ about 500° C.; if the heat-treating period is ≤ about 12-18 hours, then the heat-treating temperature utilized is ≥ about 475° C.; and if the heat-treating period is ≤ about 18-25 hours, then the heat-treating temperature utilized is ≥ about 450° C.

According to another exemplary embodiment, the heat-treating period is ≥0.5 hours and if the heat-treating period is about 0.5-1 hours, then heat-treating temperature utilized is ≥ about 500° C.; if the heat-treating period is ≤ about 1-3 hours, then the heat-treating temperature utilized is ≥ about 475° C.; if the heat-treating period is ≤ about 3-6 hours, then the heat-treating temperature utilized is ≥ about 450° C.; if the heat-treating period is ≤ about 6-12 hours, then the heat-treating temperature utilized is ≥ about 425° C.; if the heat-treating period is ≤ about 12-18 hours, then the heat-treating temperature utilized is ≥ about 400° C.; and if the heat-treating period is ≤ about 18-25 hours, then the heat-treating temperature utilized is ≥ about 375° C.

According to another exemplary embodiment, the heat-treating period is ≥0.5 hours and if the heat-treating period is about 0.5-1 hours, then heat-treating temperature utilized is ≥ about 650° C.; if the heat-treating period is ≤ about 1-3 hours, then the heat-treating temperature utilized is ≥ about 625° C.; if the heat-treating period is ≤ about 3-6 hours, then the heat-treating temperature utilized is ≥ about 600° C.; if the heat-treating period is ≤ about 6-12 hours, then the heat-treating temperature utilized is ≥ about 575° C.; if the heat-treating period is ≤ about 12-18 hours, then the heat-treating temperature utilized is ≥ about 550° C.; and if the heat-treating period is ≤ about 18-25 hours, then the heat-treating temperature utilized is ≥ about 525° C.

Exemplary Strengthened Glasses

Exemplary embodiments of chemically strengthened glasses include soda-lime silicate glass and sodium aluminosilicate glass which are strengthened, such as, in potassium nitrate salt baths. Chemical strengthening to make the strengthened glasses may be performed within a broad range of ion-exchange temperatures applied during a broad range of ion-exchange periods of time.

Ion-exchange temperatures which may be utilized vary broadly and may be constant or an average of different temperatures. Exemplary embodiments of ion-exchange temperatures which may be utilized in conducting ion exchange include from about 200° C. to 1,400° C. For some types of soda-lime silicate glass, ion-exchange temperatures above about 400° C. and preferably above about 430° C. may be used. Other exemplary ion-exchange temperatures for various types of glasses include about 200, 300, 400, 500, 600, 700, 800, 900, 1,000, 1,100, 1,200, 1,300 and 1,400° C., or higher temperatures.

Ion-exchange periods of time which may be utilized vary broadly and may be continuous or discontinuous. Exemplary embodiments of ion-exchange periods which may be utilized in conducting ion exchange include from about 0.1 to 50 hours. For some types of soda-lime silicate glass, for example, ion-exchange periods of about 1 to 5 hours may be utilized. Other exemplary ion-exchange periods for various types of glasses include a period in hours of about 0.01, 0.1, 0.5, 1, 2, 4, 5, 6, 8, 10 20, 25 and 50 hours, or longer.

The zone of compressive stress may vary and be developed, for example, within a diffusion depth of about 5, 10, 20, 30, 40, 50, 60, 70, 80, 90, 100, 125, 150, 200, 300, 400, 500 and 600 μm of a surface of a substrate glass. According to an exemplary embodiment, compressive stress in a strengthened glass substrate is greatest at a surface (i.e., a "surface compression") of the glass and the level of compressive stress may follow a gradient extending downward from the surface through a case depth in the strengthened glass.

In exemplary embodiments, the amount of surface compressive stress (i.e., surface compression) may vary from 100-2,000 MPa. In exemplary embodiments, surface compressive stress may range up to about 800 MPa or higher in strengthened soda-lime silicate glass and up to about 1,200 MPa or higher in aluminosilicate glass. In some exemplary embodiments, surface compression is about 200-650 MPa in strengthened soda-lime silicate glass and about 300-850 MPa in aluminosilicate glass. In other exemplary embodiments, surface compression is about 400-600 MPa in strengthened soda-lime silicate glass and about 600-800 MPa in aluminosilicate glass.

In some exemplary embodiments, a strengthened silicate glass, such as soda-lime silicate glass or sodium aluminosilicate glass comprises alumina, at least one alkali metal and, in some embodiments, greater than 50 mol % $SiO_2$, in other embodiments at least 58 mol % $SiO_2$, and in still other embodiments at least 60 mol % $SiO_2$. In these embodiments, a $Li_2O+Na_2O+K_2O$ total mol %, such as in a volume associated with a diffusion depth, is at least about 1, 2, 5, 7 or 8-10 mol % and ≤25 mol %, preferably ≤20 mol %, and more preferably ≤ about 2, 5, 7, 8, 10, 12, or 16-18 mol %.

In another exemplary embodiment, an alkali aluminosilicate glass comprises, consists essentially of, or consists of: 60-75 mol % $SiO_2$; 5-15 mol % $Al_2O_3$; 0-12 mol % $B_2O_3$; 8-21 mol % $Na_2O$; 0-8 mol % $K_2O$; 0-15 mol % MgO; and 0-3 mol % CaO. In these embodiments, such as in a volume associated with a diffusion depth, a $Li_2O+Na_2O+K_2O$ total mol % is at least about 1, 2, 5, 7 or 8-10 mol % and ≤25 mol %, preferably ≤20 mol %, and more preferably ≤ about 2, 5, 7, 8, 10, 12, 15 or 16-18 mol %.

In yet another embodiment, an alkali aluminosilicate glass substrate comprises, consists essentially of, or consists of: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-15 mol % MgO; 0-10 mol % CaO; 0-5 mol % $ZrO_2$; 0-2 mol % $SnO_2$; 0-1 mol % $CeO_2$; wherein about 1, 2, 5, 7, 8, or 10-12 mol %≤ $Li_2O+Na_2O+K_2O$≤ about 2, 5, 7, 8, 10, 12, 15 or 16-20 mol %, such as in a volume associated with a diffusion depth, and 0 mol %≤ MgO+CaO≤15 mol %.

In one example embodiment, sodium ions in the substrate glass are replaced by potassium ions from a molten bath, though other alkali metal ions having a larger atomic radius, such as rubidium or cesium, may replace smaller alkali metal ions in the glass. Similarly, other alkali metal salts such as, but not limited to, nitrates, sulfates, halides, and the like may be used in the ion exchange process.

Exemplary embodiments of strengthened glass substrates include substrates having one or more widths of about 25, 20, 15, 10, 8, 6, 5, 4, 3, 2, 1, 0.7, 0.5, 0.25 and 0.1 mm. A strengthened substrate may be varied in length and cross-area. For example, a strengthened glass may be sheet produced in a continuous process. In another example, a strengthened glass may be a coupon produced in a batch process.

In another example embodiment, a chemically-strengthened glass substrate may have at least one compressive stress layer (i.e., case depth) having a depth in μm of about 1,000, 500, 250, 150, 100, 90, 80, 70, 60, 50, 45, 40, 35, 30, 25, 20, 15, 10, 5, 1 or less.

In another example embodiment, a chemically-strengthened glass substrate may have a surface compressive stress of about 100 MPa or more (e.g., about 200, 300, 400, 500, 600, 700, 800, 900, 1000, 1500 or 2000 MPa or more), a case depth of about 1 μm or more (e.g., about 5, 10, 20, 25, 30, 35, 40, 45, 50, 55, 60, 65, 70, 75, 80, 85, 90, 95, 100 μm or more) and a diffusion depth of about 1 μm or more (e.g., about 5, 10, 20, 25, 30, 35, 40, 45, 50, 55, 60, 65, 70, 75, 80, 85, 90, 95, 100, 125 or 150 μm or more).

In another example embodiment, a chemically-strengthened glass substrate may have a higher amount of metal in at least one surface volume or layer, such as a treatment-rich volume or a treatment-poor volume, than in a bulk volume adjacent these surface volumes. A concentration of metal in at least one of the treatment-poor volume and the treatment-rich volume may be, in mol %, ≥ about 0.4, 1.0, 1.5, 2.0, 2.5, 3.0, 4.0, 5.0, 6.0, 8.0, 10.0, 12.0, 15.0, or 25 mol % higher than a concentration of the metal in the bulk volume. According to an embodiment, a concentration of metal in the treatment-poor volume is higher than a concentration of the metal in a treatment-rich volume. An example of strengthened glass with variant metal concentrations in the different volumes is chemically strengthened glass made from a flat glass substrate prepared by a float glass process utilizing tin.

In another example embodiment, a chemically-strengthened glass substrate may have an average concentration of alkali ions (e.g. invading alkali ions and host alkali ions) that is the same or different in a diffusion depth of a surface volume than in an adjacent volume, such as a bulk volume. The surface volume may be a treatment-rich volume or a treatment-poor volume in the strengthened glass. The average concentration of alkali ions may be the same or different from an average concentration of alkali ions in the adjacent volume, such as a bulk volume. In one example embodiment, the average concentration of alkali ions in the diffusion depth of the surface volume is ≤ to about 0.5 mol % higher than a concentration of the alkali ions in the bulk volume. In other embodiments, the average concentration of alkali ions in the diffusion depth of the surface volume is ≤ to about 0.4, 0.3, 0.2, 0.1 or 0.05 mol % higher, equal to or less than a concentration of the alkali ions in the bulk volume adjacent the surface volume.

Exemplary Exchange Mediums

Exemplary embodiments of a liquid exchange medium which may be utilized in chemical strengthening include liquid molten salt baths. The molten liquid baths include invading alkali ions having an average ionic radius in the alkali metal ion of the molten salt that is larger than an average ionic radius of host alkali metal ions in the substrate glass prior to ion exchange. A common example of a liquid molten salt bath includes potassium nitrate with potassium as the invading alkali ion to replace sodium and/or lithium host ions in the substrate glass.

Mixed salt blends of invading alkali ions may also be used as liquid exchange mediums. These blends may include salts of different alkali metals, preferably different alkali metal nitrates. A nitrate melt blend may include at least two different alkali ions, for example Na and K, or Na and Rb, or K and Rb, or K and Cs. But it is also possible that three or four different alkali metals are included. The method according to the embodiment offers the option to effectively incorporate invading alkali ions into a treated glass article having ionic radii that are significantly larger than the radii of host alkali ions, such as lithium or sodium ions.

Exemplary embodiments of a solid exchange medium which may be utilized in chemical strengthening include semi-solid pastes that may be applied to a surface of a glass substrate. The paste includes invading alkali ions from a source such as a salt and at least one rheological agent, such as clay, to suspend the ions in the solid exchange medium. Kaolin is a common example of a rheological agent which may utilized in making a solid exchange medium. The viscosity of a paste made with kaolin may be modified with water and other additives to suit an application by which the paste is applied to a glass substrate. Water content of a paste may be evaporated prior to application as a solid exchange medium utilizing a raised high temperature, such as greater than 120° C. Another example of a rheological agent is aluminosilicate fiber. Other clays and rheological agents are also contemplated.

In addition to liquid and solid exchange mediums, gas exchange mediums are also contemplated. An exchange medium may include a composition that affects the ion exchange rate of invading alkali ions in the exchange medium. The composition may increase or decrease the rate of ion exchange of invading alkali ions into a substrate. The composition may be modified in many different ways to affect the rate of ion exchange associated with the exchange medium such as by adding an additive that slows the rate of ion exchange.

EXAMPLES

The following examples demonstrate methods of making chemically strengthened glass utilizing heat treatment methodology.

Example 1

Example 1 demonstrates the preparation of a chemically strengthened soda-lime silicate glass having a reduced induced curvature.

Sample Preparation:

Soda-lime silicate glass coupons, 50 mm×50 mm across and 0.4 mm width, were cut from a mother sheet formed by a tin float glass process. Coupons were heat-treated in a muffle furnace in air (oxidizing atmosphere) at 550° C. for 2.0 hours. Coupons were then chemically strengthened by direct submersion of the coupons from the muffle furnace into a beaker of molten $KNO_3$ temperature-controlled to 440° C. for 8 hours. Coupons were cooled and rinsed with water to remove solidified salt. A minimum of two coupons were examined for each parameter. Coupon deflection after processing was determined from surface profiles measured using a non-contact optical profiler. Deflection is the peak-to-valley height determined along a line drawn between opposite edge mid-points of the square coupon.

Results:

Average deflection versus pre-treatment parameter is given in Table 1 below, where positive deflection indicates convex curvature of the rich surface and negative deflection indicates concave curvature of the rich surface. For commercial purposes, such as use in personal electronic devices and flat panel displays, acceptable deflection is currently 0.1% of the linear span—corresponding to 50 micron for a 50 mm span.

TABLE 1

Average deflection in micron after heat treatment, given as temperature in degrees Celsius and time in hours, and chemical strengthening.

| Temperature (° C.) | Time (hours) | Average Deflection (micron) |
|---|---|---|
| 550 | 2.0 | 42.7 |
| Reference | — | 94.7 |

Heat treatment at 550° C. for 2.0 hours in air prior to chemical strengthening produced deflection less than the 50 micron target in this instance. Surface compression and case depth resulting from chemical strengthening was measured using an ellipsometer. For heat-treated coupons after chemical strengthening, average deflection was 42.7 micron (rich side convex), average surface compression was 705 MPa for the rich surface and 737 MPa for the poor surface, average case depth was 13.8 micron for the rich surface and 12.4 micron for the poor surface.

Comparative coupons, which did not undergo a heat treatment, but underwent equivalent chemical strengthening, had average deflection of 94.7 micron (rich side convex).

Example 2

Example 2 demonstrates the preparation of a longer time chemically strengthened soda-lime silicate glass having a reduced induced curvature.

Sample Preparation:

Soda-lime silicate glass coupons, 50 mm×50 mm across and 0.4 mm width, were cut from a mother sheet formed by a tin float glass process. Coupons were heat-treated in a muffle furnace in air (oxidizing atmosphere) at 550° C. for 0.5 hours and 550° C. for 2.0 hours. Coupons were cooled to room temperature then chemically strengthened by submersion in a beaker of molten $KNO_3$ temperature-controlled to 440° C. for 24 hours. Coupons were cooled and rinsed with water to remove solidified salt. A minimum of three coupons were examined for each parameter. Coupon deflection after processing was determined from surface profiles measured using a non-contact optical profiler. Deflection is the peak-to-valley height determined along a line drawn between opposite edge mid-points of the square coupon.

Results:

Average deflection versus pre-treatment parameter is given in Table II, where positive deflection indicates convex curvature of the rich surface and negative deflection indicates concave curvature of the rich surface. For commercial purposes, such as use in personal electronic devices and flat panel displays, acceptable deflection is currently 0.1% of the linear span—corresponding to 50 micron for a 50 mm span.

Heat treatment parameters of 550° C. for 2.0 hours in air prior to chemical strengthening produced deflection less than the 50 micron target in this instance. Surface compression and case depth resulting from chemical strengthening was measured using an ellipsometer. Because longer chemical strengthening time was used in Example 2, the case depth was significantly larger and the surface compression magnitude was significantly lower than for Example 1.

TABLE 2

Average deflection in micron after heat treatment, given as temperature in degrees Celsius and time in hours, and chemical strengthening.

| Temperature (° C.) | Time (hours) | Average Deflection (micron) |
|---|---|---|
| 550 | 0.5 | 75.8 |
| 550 | 2.0 | 37.3 |
| Reference | — | 110.3 |

For the 550° C., 2.0 hour, air heat treatment condition after chemical strengthening, average deflection was 37.3 micron (rich side convex), average surface compression was 582 MPa for the rich surface and 596 MPa for the poor surface, average case depth was 24.8 micron for the rich surface and 22.2 micron for the poor surface. Witness coupons, which did not undergo a heat treatment, but underwent equivalent chemical strengthening, had average deflection of 110.3 micron (rich side convex).

Example 3

Example 3 demonstrates the relationship between heat-treating period and reduced induced curvature after chemical strengthening.

Sample Preparation:

Soda-lime silicate glass coupons, 50 mm×50 mm across and 0.4 mm width, were cut from a mother sheet formed by a tin float glass process. Coupons were heat-treated in a muffle furnace in air (oxidizing atmosphere) at 525° C. for varying lengths of time as shown as square-root of time in hours in the x-axis of graph 200. Coupons were cooled to room temperature then chemically strengthened by submersion in a beaker of molten $KNO_3$ temperature-controlled to 440° C. for 24 hours. Coupons were cooled and rinsed with water to remove solidified salt. A minimum of two coupons were examined for each parameter. Coupon deflection after processing was determined from surface profiles measured using a non-contact optical profiler. Deflection is the peak-to-valley height determined along a line drawn between opposite edge mid-points of the square coupon.

Results:

Average deflection versus square-root of heat treatment time is given in graph 200, where positive deflection indicates convex curvature of the rich surface. For commercial purposes, such as use in personal electronic devices and flat panel displays, acceptable deflection is currently 0.1% of the linear span—corresponding to 50 micron for a 50 mm span.

Graph 200 shows average deflection in micron after heat treatment at 525° C. versus square-root of heat-treating period in hours, and chemical strengthening. With the assumption that 610° C. is the maximum heat-treating temperature ("m") and 0.0015 hours/(° C.)$^2$ is the empirical constant ("n") for the example glass coupons, an empirical relationship between the heat-treating period "t" (hours) which may be utilized for the deflection to reduce to acceptable value (~0.1% of the coupon length dimension) is approximately given by t=0.0015*(610−T)$^2$ hours, where T is the heat-treating temperature in degree ° C. Similar heat-treating temperature and heat-treating period relationships can be developed for other glass compositions and glass substrates by those having ordinary skill in the art using the empirical relationship demonstrated herein.

Exemplary Methodologies

Float Glass: During float glass manufacture, a glass may be cooled in a carefully controlled manner such that internal stresses are alleviated—this is termed "annealing." Before, during, or after the annealing, the methodology treatment temperature and time can be modified such that the heat treatment method may be incorporated on-line. This generally includes use of longer periods of time at an elevated temperature than the annealing, where the extended length of time may be dependent upon the temperature selected. Such heat treatment may be carried out in an oxidizing atmosphere, in a neutral atmosphere, or in a reducing atmosphere, or step-wise combinations thereof. Such curvature-reducing heat-treated substrate may then be chemically strengthened, per an ion-exchange process, with less curvature resulting. The chemical strengthening may occur immediately following the curvature control treatment methodology, or at a later time.

A temperature utilized in the heat treatment may also be subject to the physical and chemical properties of the unstrengthened glass to be chemically strengthened. Temperature variations employed in the heat treatment methodology may be broadened by utilizing a suitable support system to avoid dimensional distortion in thin glass sheets undergoing the heat treatment. A process for manufacturing glass, such as manufacturing via a float method, may be modified such that one or more of the curvature control methodologies can be applied at higher temperatures.

Pre-Heating Device:

Pre-heating devices are commonly used prior to chemical strengthening to heat a glass article immediately prior to submersion into a molten exchange medium. This type of pre-heating aids in prevention of glass breakage, such as is likely to occur if a cold glass article is submerged in a hot, molten exchange medium.

According to the innovation, with as-manufactured glass, such as float glass ready for the chemical strengthening process, the temperature and time utilized in a pre-heating device can be modified by increasing the time and/or temperature as described herein to achieve a heat-treating temperature and/or heat-treating period conditions such that a curvature-reducing heat treatment may be accomplished in the pre-heating device.

At higher temperatures a suitable support system may also be utilized to avoid dimensional distortion in thin glass sheets. Such heat treatment may be carried out in an oxidizing atmosphere, in a neutral atmosphere, in a reducing atmosphere, or step-wise combinations thereof. Such glass may then be directly submerged in an exchange medium to perform chemical strengthening, per an ion-exchange process, with less curvature resulting.

Batch Process:

A batch of as-manufactured float glass may be placed in a suitable furnace and held at sufficient elevated temperature for sufficient time within an oxidizing atmosphere, a neutral atmosphere, a reducing atmosphere, or step-wise combinations thereof to achieve the heat treatment method. At higher temperatures a suitable support system may be utilized to avoid dimensional distortion in thin glass sheets. After cooling, or at a later time, such glass may then be chemically strengthened, per an ion-exchange process via, for example, immersion in a molten salt or application of a salt-containing paste, with less curvature resulting.

Applicants have performed chemical strengthening with preceding heat treatment(s) in air, 40% $O_2$+60% $N_2$, 60% $O_2$+40% $N_2$, 100% $O_2$, pure nitrogen and 95% $N_2$+5% $H_2$ atmospheres. In each case, a reduction in deflection over reference specimens was observed. The curvature resulting from chemical strengthening is lessened by heat treatment to an elevated temperature under conditions such as in an oxidizing atmosphere, in a neutral atmosphere, in a reducing atmosphere, or step-wise combinations thereof prior to chemical strengthening.

Curvature of chemically strengthened glass articles can be controlled, including thin glass articles. Surface visible optical and finish (metrology) qualities of formed glass articles are similar to those that result from float manufacturing processes. However, no grinding, polishing, etching, or milling of the glass surfaces is needed. And, no permanent surface coatings need be applied to the formed glass articles. The total alkali concentrations of the glass surfaces are not altered. Thus the chemical durability properties remain similar to those that result as-manufactured by float manufacturing processes.

A heat treatment method may be very simple and may be accomplished as an on-line process performed at the time of float-glass manufacture by judicious control of temperature and time before, during, or after annealing. A heat treatment method may be performed any time prior to chemical strengthening. One example is in a preheater positioned above a molten exchange medium. In such an arrangement, a curvature control heat treatment method may be accomplished in a chamber as a preheating process to avoid breakage or with a separate preheating process to avoid breakage prior to submersion in ion-exchange. Alternatively, many glass articles may undergo a curvature-reducing heat treatment method in a suitable furnace held at sufficient temperature for sufficient time within an oxidizing atmosphere, a neutral atmosphere, a reducing atmosphere, or step-wise combinations thereof.

FIG. 3 is flowchart illustrating an exemplary process 300 for making a strengthened substrate with reduced induced curvature utilizing heat treatment.

At step 302, a glass substrate is provided having different volumes, such as a "treatment-rich" volume and a "treatment-poor" volume in the glass structure including host alkali ions. The provided substrate glass may be soda-lime silicate glass or aluminosilicate glass. The volumes may be located, for example, as opposed to each other in the substrate, and according to an embodiment, may be diametrically opposed. The glass substrate may have variations in the different volumes, such as a variation in chemical composition and/or chemical structure. An example of a variation in chemical composition is an amount of tin situated in different volumes of the glass. An example of a variation in chemical structure is the presence of tin in different valences, $Sn^{2+}$ and $Sn^{4+}$ in different volumes of the glass. A variation in chemical composition and/or chemical structure in the treatment-poor volume may distinguish it from the treatment-rich volume.

At step 304, the provided substrate glass is heated in a heat treatment process to a temperature T1 for a period of time P1. T1 may vary from 250° C. up to a maximum heat-treating temperature associated with a temperature at which the substrate glass may be distorted, such as above 600° C. for a soda-lime silicate glass or 800° C. for a sodium aluminosilicate glass. The period of time P1 may vary from 0.05-20 hours or longer.

At step 306, the heat-treated substrate glass is removed from heat and allowed to cool, such as to an ambient temperature or another temperature, such as ≤ about 150° C., to produce a cooled heat-treated substrate. The cooling process is not controlled, as in annealing, which, by contrast, requires prescribed periods of cooling at predetermined temperature ranges and prescribed rates of cooling. According to additional exemplary embodiments, step 306 may be omitted or repeated.

At step 308, the cooled heat-treated substrate glass is again heated in a subsequent heat-treatment process to a temperature T2 for a period of time P2. T2 may vary from 250° C. to within a few degree of the desired exchange temperature such that immersion into the molten salt bath would not cause thermal shock fracture of the substrate. The period of time P2 may vary from 0.05-20 hours or longer. As an option, step 308 may also be conducted as part of curvature-reducing heat treatment. According to additional exemplary embodiments, step 308 may be omitted.

At step 310, heat-treated substrate is submerged in an exchange medium of molten $KNO_3$ at temperature T3. The exchange medium providing invading alkali ions that are potassium. T3 may vary broadly, from 200° C. to 1,000° C., and may be, for example 450° C.

At step 312, the submerged substrate undergoes ion exchange for time period P3. Time period P3 may vary broadly, from 0.1 to 50 hours. During ion exchange a compressive stress layer forms in the strengthened substrate. The compressive stress layer having a depth from about 1-500 μm, and in an embodiment, from about 5-200 μm. The amount of induced curvature from chemical strengthening is reduced in the strengthened substrate through the heat treatment in step 304.

Although described specifically throughout the entirety of the disclosure, the representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the principles of the invention. While the examples have been described with reference to the figures, those skilled in the art are able to make various modifications to the described examples without departing from the scope of the following claims, and their equivalents.

What is claimed is:

1. A method for making a strengthened substrate, the method comprising:
   providing a float glass substrate, having dimensions including a width ≤ about 25.0 millimeters, characterized by having a chemical composition and a glass chemical structure including host alkali ions having an average ionic radius situated in the glass chemical structure and dimensional volumes including a treatment-rich volume and a treatment-poor volume located as opposed to each other in the provided substrate;
   determining a heat-treating temperature for producing reduced induced curvature in the substrate after chemical strengthening based, at least in part, on a maximum heat-treating temperature associated with the substrate and the chemical composition;
   determining a heat-treating period for producing reduced induced curvature in the substrate after chemical strengthening based, at least in part, on the heat-treating temperature and the maximum heat-treating temperature;
   heating the provided substrate in a heat treatment to the heat-treating temperature ≥about 250° C. and ≤ a maximum heat-treating temperature for the heat-treating period of about 0.001-50 hours, wherein if the heat-treating temperature is ≤ about 325° C., then the heat-treating period is about 2 hours, to produce a heat-treated substrate;
   providing an exchange medium including invading alkali ions having an average ionic radius that is larger than the average ionic radius of the host alkali ions;
   exposing the heat-treated substrate to the exchange medium; and
   conducting ion exchange to chemically strengthen the substrate while exposing the heat-treated substrate to the exchange medium to produce a strengthened substrate,
   wherein the strengthened substrate includes a compressive stress layer having a depth of about 1-500 μm,
   wherein the heat-treating temperature and the heat-treating period for producing reduced induced curvature in the substrate after chemical strengthening are determined, at least in part, based upon satisfying the relationship:

$$t \approx n*(m-T)^2$$

"t" being the heat treating period in hours,
   "n" being an empirical constant,
   "m" being the maximum heat-treating temperature in ° C., and
   "T" being the heat-treating temperature in ° C.,
   wherein the strengthened substrate has a reduced induced curvature after chemical strengthening based on the heat treatment.

2. The method of claim 1, wherein the provided substrate has a width of ≤ about 2.0 millimeters,
   wherein a net bending moment about mid-plane is about zero in the strengthened substrate.

3. The method of claim 1, wherein the heat-treating temperature is about 450-650° C.

4. The method of claim 1, wherein the heat-treating temperature is about 400-750° C.

5. The method of claim 1, wherein if the heat-treating temperature is ≤ about 400° C., then the heat-treating period is ≥ about 2 hours.

6. The method of claim 1, wherein the strengthened substrate has a compressive stress layer having a depth of about 5-200 μm.

7. The method of claim 1, wherein conducting ion exchange occurs during an ion-exchange period of about 0.1 to 50 hours.

8. The method of claim 1, wherein conducting ion exchange occurs at an ion-exchange temperature of about 200° C. to 1,400° C.

9. The method of claim 1, wherein the provided substrate is flat.

10. The method of claim 1, wherein the heat-treating period is ≥0.5 hours and
if the heat-treating period is about 0.5-1 hours, then the heat-treating temperature is ≥ about 500° C.;
if the heat-treating period is ≤ about 1-3 hours, then the heat-treating temperature is ≥ about 475° C.;
if the heat-treating period is ≤ about 3-6 hours, then the heat-treating temperature is ≥ about 450° C.;
if the heat-treating period is ≤ about 6-12 hours, then the heat-treating temperature is ≥ about 425° C.;
if the heat-treating period is ≤ about 12-18 hours, then the heat-treating temperature is ≥ about 400° C.; and
if the heat-treating period is ≤ about 18-25 hours, then the heat-treating temperature is ≥ about 375° C.

11. The method of claim 1, wherein the heat-treating period is ≥0.5 hours and
if the heat-treating period is about 0.5-1 hours, then the heat-treating temperature is ≥ about 575° C.;
if the heat-treating period is ≤ about 1-3 hours, then the heat-treating temperature is ≥ about 550° C.;
if the heat-treating period is ≤ about 3-6 hours, then the heat-treating temperature is ≥ about 525° C.;
if the heat-treating period is ≤ about 6-12 hours, then the heat-treating temperature is ≥ about 500° C.;
if the heat-treating period is ≤ about 12-18 hours, then the heat-treating temperature is ≥ about 475° C.; and
if the heat-treating period is ≤ about 18-25 hours, then the heat-treating temperature is ≥ about 450° C.

12. The method of claim 1, wherein the heat-treating period is ≥0.5 hours and
if the heat-treating period is about 0.5-1 hours, then the heat-treating temperature is ≥ about 650° C.;
if the heat-treating period is ≤ about 1-3 hours, then the heat-treating temperature is ≥ about 625° C.;
if the heat-treating period is ≤ about 3-6 hours, then the heat-treating temperature is ≥ about 600° C.;
if the heat-treating period is ≤ about 6-12 hours, then the heat-treating temperature is ≥ about 575° C.;
if the heat-treating period is ≤ about 12-18 hours, then the heat-treating temperature is ≥ about 550° C.; and
if the heat-treating period is ≤ about 18-25 hours, then the heat-treating temperature is ≥ about 525° C.

13. The method of claim 1, further comprising
cooling the heat-treated substrate to a cooled temperature ≤ about 150° C. to produce a cooled heat-treated substrate; and
heating the cooled heat-treated substrate to the heat-treating temperature ≥ about 250° C. and ≤ the maximum heat-treating temperature for a heat-treating period of about 0.01-50 hours to produce the heat-treated substrate.

14. The method of claim 1, wherein the provided substrate comprises a variation in at least one of chemical composition and chemical structure in the substrate and at least one of the chemical composition and chemical structure in the treatment-poor volume is different than in the treatment-rich volume.

15. The method of claim 1, wherein the exchange medium is one of a liquid, a solid, a gas and mixtures thereof.

16. The method of claim 1, wherein the treatment-rich volume and the treatment-poor volume are located as diametrically opposed in the substrate.

17. The method of claim 1, wherein the method is one of a continuous process and a batch process.

18. The method of claim 1, wherein the provided substrate comprises one of alkali aluminosilicate glass and soda-lime silicate glass.

* * * * *